United States Patent

Slater et al.

[15] 3,691,850

[45] Sept. 19, 1972

[54] HIGH SENSITIVITY ACCELEROMETER

[72] Inventors: John M. Slater, Fullerton; Doyle E. Wilcox, Hacienda Heights, both of Calif.

[73] Assignee: North American Rockwell Corporation

[22] Filed: Feb. 24, 1970

[21] Appl. No.: 15,971

Related U.S. Application Data

[62] Division of Ser. No. 664,496, Aug. 30, 1967, Pat. No. 3,564,928.

[52] U.S. Cl. .................................................73/516 R
[51] Int. Cl. ...............................................G01p 15/08
[58] Field of Search..............................73/515, 516

[56] References Cited

UNITED STATES PATENTS 2,974,531   3/1961   Ackerman....................73/516

*Primary Examiner*—James J. Gill
*Attorney*—L. Lee Humphries, H. Fredrick Hamann and Richard J. Rengel

[57] ABSTRACT

A accelerometer for extraterrestrial craft which can be tested on earth by being isolated from gravity is constructed having a movable proof mass member which is either a hollow metalized conductor loop suspended by filaments, or a hollow sphere of ferromagnetic material. In either case, the net density of the proof mass member is such as to permit substantially complete flotation of the proof mass in water maintained at the temperature of maximum density. The proof mass is then immersed in the water so as to attenuate gravity to any desired degree. The instrument may then be tested in known ways in the laboratory, and the water removed before the accelerometer goes into service in the craft. The invention herein described was made in the course of or under a contract or subcontract thereunder, with the Air Force.

7 Claims, 7 Drawing Figures

PATENTED SEP 19 1972

INVENTORS
JOHN M. SLATER
DOYLE E. WILCOX

BY

ATTORNEY

INVENTORS
JOHN M. SLATER
DOYLE E. WILCOX
BY
ATTORNEY

HIGH SENSITIVITY ACCELEROMETER

This is a division of application Ser. No. 664,496 filed Aug. 30, 1967, now U.S. Pat. No. 3,564,928.

BACKGROUND OF THE INVENTION

1. Field of the Invention

The present invention relates to high sensitivity accelerometers and systems for testing them and, more particularly, to accelerometers intended for use in spacecraft to sense accelerations of very small magnitude, typically in the range of $10^{-5}$ to $10^{-12}$ g.

2. Description of the Prior Art

In the exploration of space by manned and unmanned vehicles there is a need for highly sophisticated and accurate inertial and stellar navigation equipment for accurately determining the motion of the vehicle in inertial space. At the relatively high speeds of travel in space, the inability to measure extremely small accelerations in the range of $10^{-5}$ to $10^{-12}$g may result in a very large navigational error over a long period of time such as encountered on missions to the moon or to other planets. There is therefore, a need for special kinds of accelerometers sensitive to $10^{-12}$g for measuring (1) very small thrust accelerations, such as produced by ion propulsion motors or by solar radiation pressure on "sails," (2) very small drag accelerations, such as produced by the earth's magnetic field or atmosphere at high altitudes, and (3) the earth's gravitational gradient at spaced points in the craft, whereby the direction of the gravity vector, i.e., vertical, can be determined.

In the design and construction of high sensitivity accelerometers, two formidable problems arise. One is the provision of an instrument which is inherently capable of sensing minute accelerations. The other is the testing and checkout of such an instrument in a laboratory on earth subject to the full acceleration of gravity. Unfortunately, no accelerometer constructed to date has been effective to satisfactorily solve both of these problems.

One prior art accelerometer consists of a proof mass which is electrostatically supported and which is provided with electrostatic pickoff and forcing means. An electrostatic support is chosen so as to provide a system in which the magnitude of the supporting forces can be readily adapted to the acceleration environment. Inasmuch as cross-coupling of the supporting forces into the sensing axis is regarded as a limiting factor in sensitivity, by suitably reducing these forces in the low acceleration space environment, it is theorized that the instrument sensitivity should be correspondingly enhanced. Such a system appears to be soundly based, technically. However, the considerable complexity of the several supporting, pickoff and forcing circuits is something to be avoided if possible, especially since the instrument is of a single-axis type and two or three would be necessary for many space guidance applications. In addition, such an instrument cannot be tested in the laboratory under applied accelerations in the low range of $10^{-5}$ to $10^{-12}$ g, and performance at these small accelerations is a matter of extrapolation or prediction rather than one of experimental fact.

Another prior art accelerometer is of the vibrating ribbon type in which a small proof mass is used for testing in the laboratory and a large proof mass is to be coupled to the ribbons after the craft is in orbit so as to make possible measurements in the range of $10^{-3}$ to $10^{-9}$ g. This apparatus too appears to be sound in principle. However, the proof mass tends to be excessively large. Furthermore, performance at low accelerations ($10^{-6}$ to $10^{-9}$ g) is also a matter of extrapolation and conjecture, not one of experimental fact, since there is no way to apply such small acceleration inputs to the instrument in the laboratory.

SUMMARY OF THE INVENTION

According to the present invention there is provided an accelerometer capable of measuring very small accelerations, e.g. $10^{-5}$ g and smaller, characterized by a construction such that it can be virtually isolated to any desired degree from gravitation in the laboratory in a manner to allow calibration and checkout under conditions closely simulating oribital conditions. This is accomplished by providing an accelerometer with a movable proof mass member of net density which permits substantially complete flotation of the proof mass member in a fluid, maintained at constant density, to a high degree, i.e. to within one part in $10^4$ to $10^5$ of complete flotation. Under these conditions, the desired inputs can be applied by simply tilting the accelerometer off level.

According to the preferred embodiment, the flotation fluid is ordinary water, $H_2O$, which may be suitably diluted with "heavy water," i.e. deuterium oxide, $D_2O$. Water is chosen as the flotation fluid because of its broad density maximum in the neighborhood of 4° C, thereby making temperature control practical. With water, the required accuracy, whether with regard to absolute or gradient temperatures, is only on the order of a few tenths or hundredths of a degree. Deuterium oxide, $D_2O$, has a density maximum of about 1.1 gm/cc at 11.2° C and solutions of $H_2O$ and $D_2O$ can be made to obtain intermediate densities and maximum points if desired.

OBJECTS

It is, therefore, an object of the present invention to provide an accelerometer which is capable of measuring very small accelerations, e.g. $10^{-5}$ g and smaller.

It is a further object of the present invention to provide an accelerometer capable of measuring very small accelerations which can be virtually isolated to any desired degree from gravitation in the laboratory.

It is a still further object of the present invention to provide a high sensitivity accelerometer which includes provisions for floating a predetermined part of the proof-body mass so as to simulate the condition of very low or zero sensed acceleration.

It is another object of the present invention to provide an accelerometer which can be calibrated and tested in a laboratory under conditions closely simulating conditions found in space.

Still other objects, features and attendant advantages of the present invention will become apparent to those skilled in the art from a reading of the following detailed description of several embodiments constructed in accordance therewith, taken in conjunction with the accompanying drawings wherein:

DESCRIPTION OF THE PREFERRED EMBODIMENTS

Figure 1:
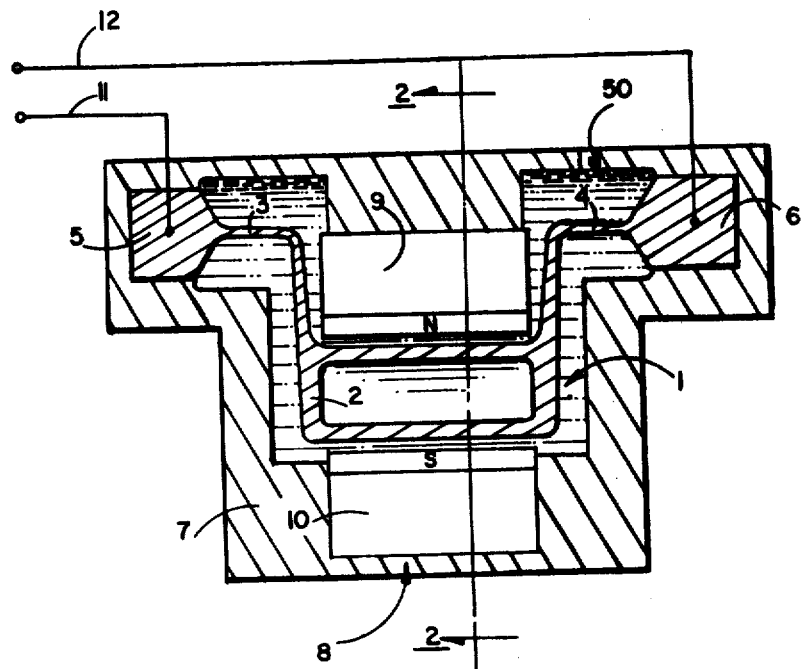
FIG. 1 is a cross-sectional view of an accelerator constructed in accordance with the teachings of the present invention in which the proof-body is a hollow conductor loop suspended by fused-silica filaments.

Referring now to the drawings and, more particularly, to FIG. 1 thereof, there is shown a cross-sectional view of an accelerometer constructed in accordance with the teachings of the present invention. The accelerometer design shown in FIG. 1 is based on an instrument disclosed in "A Miniature Accelerometer with a Fused Quartz Suspension," by A. R. Johnston, Ballistic Missile and Space Technology, Academic Press, New York, 1960, Volume 1, page 157. The instrument described therein comprises a single-turn, metalized, fused-silica pendulous element disposed in a magnetic gap with a pickoff directing current through the element to restore null. The operating range of the Johnston instrument is about $0.5 \times 10^{-4}$ g to 10 g. According to the present invention, the instrument is modified by (1) increasing the proof mass about 1,000-fold from 0.53 mgm which would have the effect of limiting the instrument to a sensitivity of 0.01 g if operated in air and (2) re-designing the instrument for operation with the pendulous element immersed in a $H_2O$ solution or a solution of $H_2O$ and $D_2O$ with temperature control provisions for buoying any desired fraction of the weight of the element.

The pendulous element or proof mass consists of a hollow member 1 which may be constructed from a fused-silica tube by known glass working techniques. Member 1 includes an enlarged portion 2 supported at the ends of filaments 3 and 4 whose other ends 5 and 6 are supported in a housing 7. Enlarged portion 2 is disposed in the gap of a suitably stabilized permanent magnet 8 as shown more clearly in FIG. 2 which shows an end view of the accelerometer of FIG. 1 taken along lines 2—2 thereof. Permanent magnet 8 has a north pole 9 and a south pole 10. Enlarged portion 2 is made conductive either by running a wire through member 1 or by plating the inside thereof with a conductive material such as gold or silver. In any event, current may be conducted through member 1 via a pair of leads 11 and 12 which are electrically connected to end portions 5 and 6.

Figure 2:
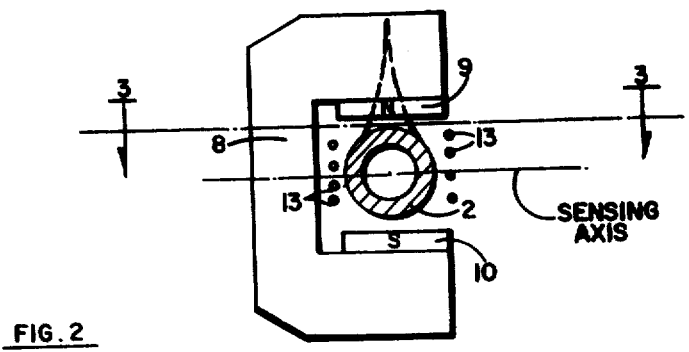
FIG. 2 is an end view of the accelerometer of FIG. 1 taken along lines 2—2 thereof.

Enlarged portion 2 may be round as shown in FIG. 2 or may be flattened so as to permit a smaller gap between portion 2 and poles 9 and 10. Typically, the gap is of the order of a millimeter.

Enlarged portion 2 constitutes the accelerometer proof mass. Deflection under acceleration along the sensing axis as shown in FIG. 2 may be sensed by a suitable optical or electromagnetic pickoff and a restoring current may be supplied to member 1 via a controller of known type to restore proof mass 2. Suitable controllers are described in Inertial Guidance Sensors by John M. Slater, Reinhold Publishing Corp., New York, 1958, pages 172–181.

Figure 3:
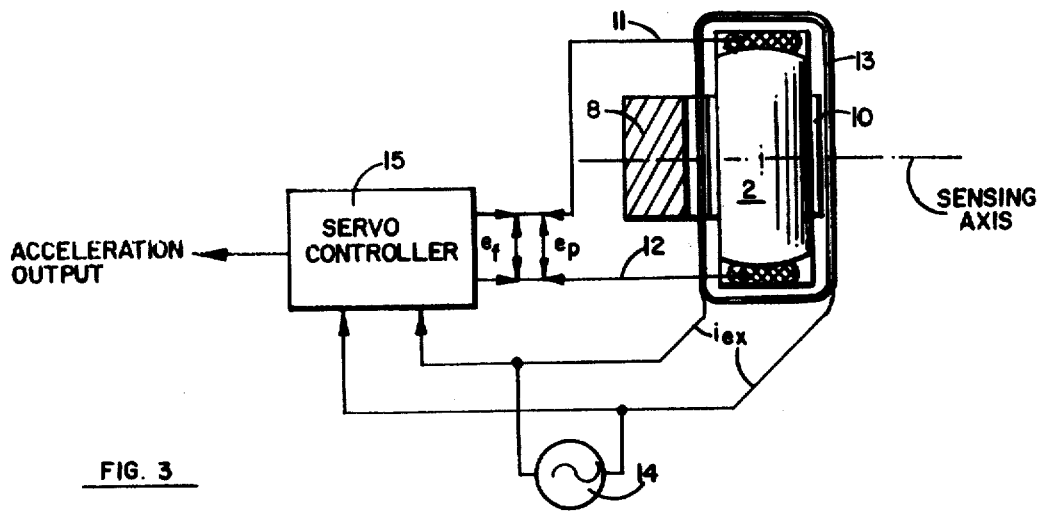
FIG. 3 is a view of the accelerometer of FIGS. 1 and 2 taken along lines 3—3 of FIG. 2 and showing one possible arrangement of a position pickoff.

Referring now to FIG. 3, there is shown a view of the accelerometer of FIGS. 1 and 2 taken along lines 3-3 of FIG. 2, showing an arrangement for an inductive pickoff. The pickoff consists of an excitation coil 13 which surrounds proof mass 2. A carrier generator 14 supplies an excitation current $i_{ex}$ at a carrier frequency $f$ to coil 13. In this manner, a voltage $e_p$ will be induced in proof mass 2, the magnitude of which will be proportional to the deflection of proof mass 2 from the center of excitation coil 13 along the sensing axis shown in FIGS. 2 and 3. In addition, the phase of the induced voltage, $e_p$, relative to the phase of $i_{ex}$ will be opposite for proof mass positions on opposite sides of the center null position. Accordingly, the amount of acceleration can be determined by applying the signal $e_p$ and the signal $i_{ex}$ to a suitable servo controller 15 which is operative to determine the magnitude of $e_p$ and its phase relative to $i_{ex}$. Servo controller 15 may then be operative to supply to member 1 along leads 11 and 12 a suitable restoring signal $e_f$ to restore proof mass 2 to the null position. The position-induced pickoff voltage $e_p$ may be separated from the servo feedback voltage $e_f$ by means of a suitable frequency selective circuit.

Figure 4:
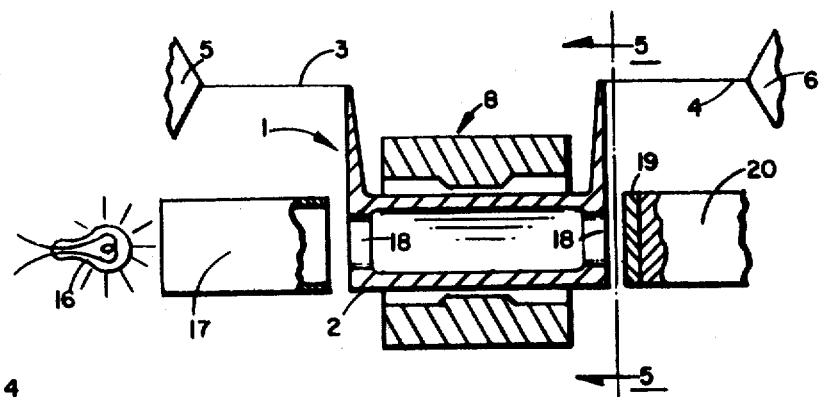
FIG. 4 is a cross-sectional view of a modification of the accelerometer of FIG. 1 showing another possible arrangement of a position pickoff.
Figure 5:
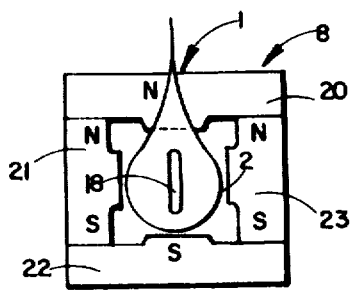
FIG. 5 is an end view of the accelerometer of FIG. 4 taken along lines 5—5 thereof.

Referring now to FIGS. 4 and 5 there is shown an arrangement for an optical position pickoff for a modified form of the accelerometer of FIG. 1. In FIG. 4, the accelerometer is modified so as to incorporate a suitable light source 16 which is positioned remotely from proof mass 2 so as to minimize the supply of heat to the critical portion of the accelerometer. The light from source 16 may be piped to within a fraction of a millimeter of the end of the cylindrical portion of proof body 2 by a suitable light pipe 17. As shown in FIG. 5, proof mass 2 is modified so that the opaque metal coating on the body thereof has a slit 18 on each end. In this manner, the light from light pipe 17 is effectively collimated by slits 18 so as to fall on a split photocell surface 19 which is supported by a means 20 adjacent to the other end of the cylindrical portion of proof body 2. Accordingly, motion of proof body 2 about the sensitive axis in response to acceleration will cause the ratio of the amount of light falling on the halves of split photocell 19 to vary, yielding a suitable differential signal to drive servo controller 15.

FIG. 5 also shows a possible configuration for permanent magnet 8 which includes a plurality of magnetic field members 20, 21, 22 and 23 which completely surround proof body 2. In this manner, magnetic field members 20–23 provide stops to limit the movement of proof body 2 when the acceleration exceeds the operating range of the instrument. These limit stops provide overload protection to suspension filaments 3 and 4.

Figure 6:
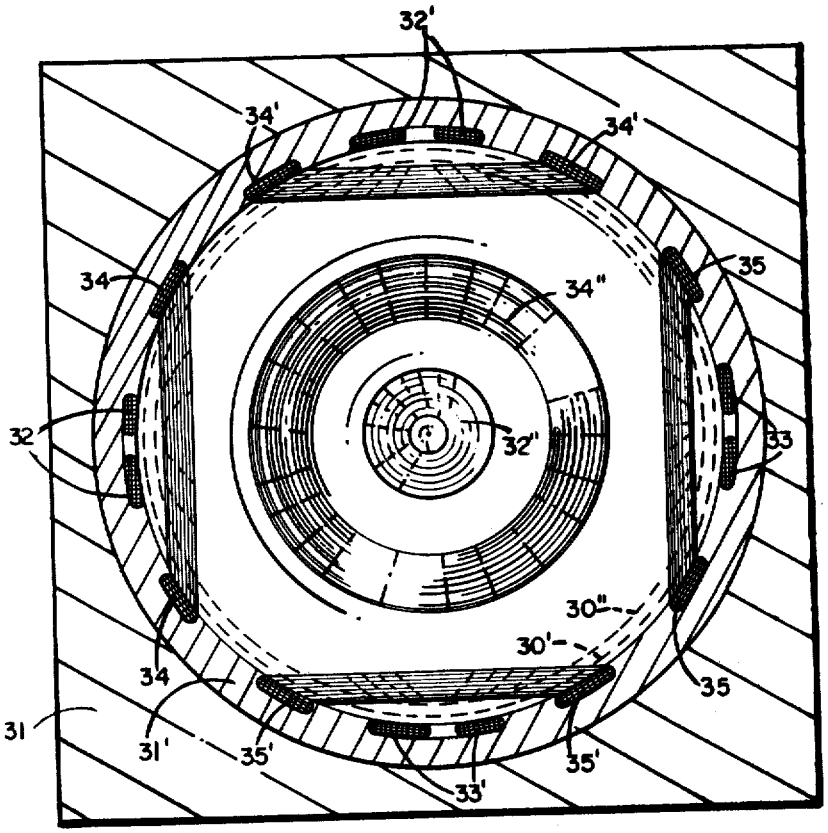
FIG. 6 is a cross-sectional view of a preferred accelerometer constructed in accordance with the teachings of the present invention in which the proof-body is a magnetically soft, ferromagnetic material and is servo-supported by electromagnets controlled from pickoffs between the body and the case.

Referring now to FIG. 6, there is shown a cross-sectional view of a preferred accelerometer constructed in accordance with the teachings of the present invention. A proof body 30, which has been omitted from FIG. 6 for explanation purposes and whose outer and inner surfaces are, therefore, shown only by dotted lines 30' and 30'', respectively, consists of a sphere of ferromagnetic material which is hollowed out to have an average density of approximately 1 gm/cc to closely match the density of water at 4° C. The accelerometer further includes a housing 31 which is also made of a ferromagnetic material. The gap between the spherical cavity forming the inside of housing 31 and proof body 30 is much larger than in most conventional instruments, i.e. it is of the order of 20 percent of the radius of proof body 30 and contains the pickoff and forcer coils. Such construction has the advantage of being extremely rugged and at the same time no electrical connections whatever have to be made to proof body 30. This is an important feature in an instrument intended for extremely small accelerations wherein lead-in wires, even with a diameter as small as an order of the wavelength of light, can exert significant bias forces.

Proof body 30 is electromagnetically suspended in housing 31 so that the suspension system is operative when water is placed in the gap between housing 31 an proof body 30. The force components required to accelerate proof body 30 along the three orthogonal axes so as to keep it tightly servoed near the pickoff null position within the cavity are applied electromagnetically by three orthogonally disposed coil pairs encapsulated within the walls of housing 31 by a suitable encapsulating material 31'. By employing a ferromagnetic proof body, reluctance type magnetic forces may be applied to proof body 30, making it unnecessary to have any electrical connection thereto.

As shown in FIG. 6, the pickoff which may be used on each of the three orthogonal axes to sense electrically the components of the proof body position vector relative to the center of the cavity in housing 31, consists of a pair of coils for each axis. More specifically, the pickoff circuit for the $x$ axis consists of a first pickoff coil 32 and a second pickoff coil 33. The forcing circuit for the $x$ axis includes a first forcing coil 34 and a second forcing coil 35. Similarly, the pickoff circuit for the $z$ axis includes first and second pickoff coils 32' and 33' and the forcing circuit includes first and second forcing coils 34' and 35'. Finally, the pickoff circuit for the $y$ axis includes a first pickoff coil 32'' and a second pickoff coil 33'' (not shown) and the forcing circuit includes a first forcing coil 34'' and a second forcing coil 35'' (also not shown). The magnetic axis of each coil lies parallel to the respective axis of proof body 30. With proof body 30 centered in the cavity, each pickoff coil will be equally spaced a small distance from the outer surface 30' of proof body 30.

Figure 7:
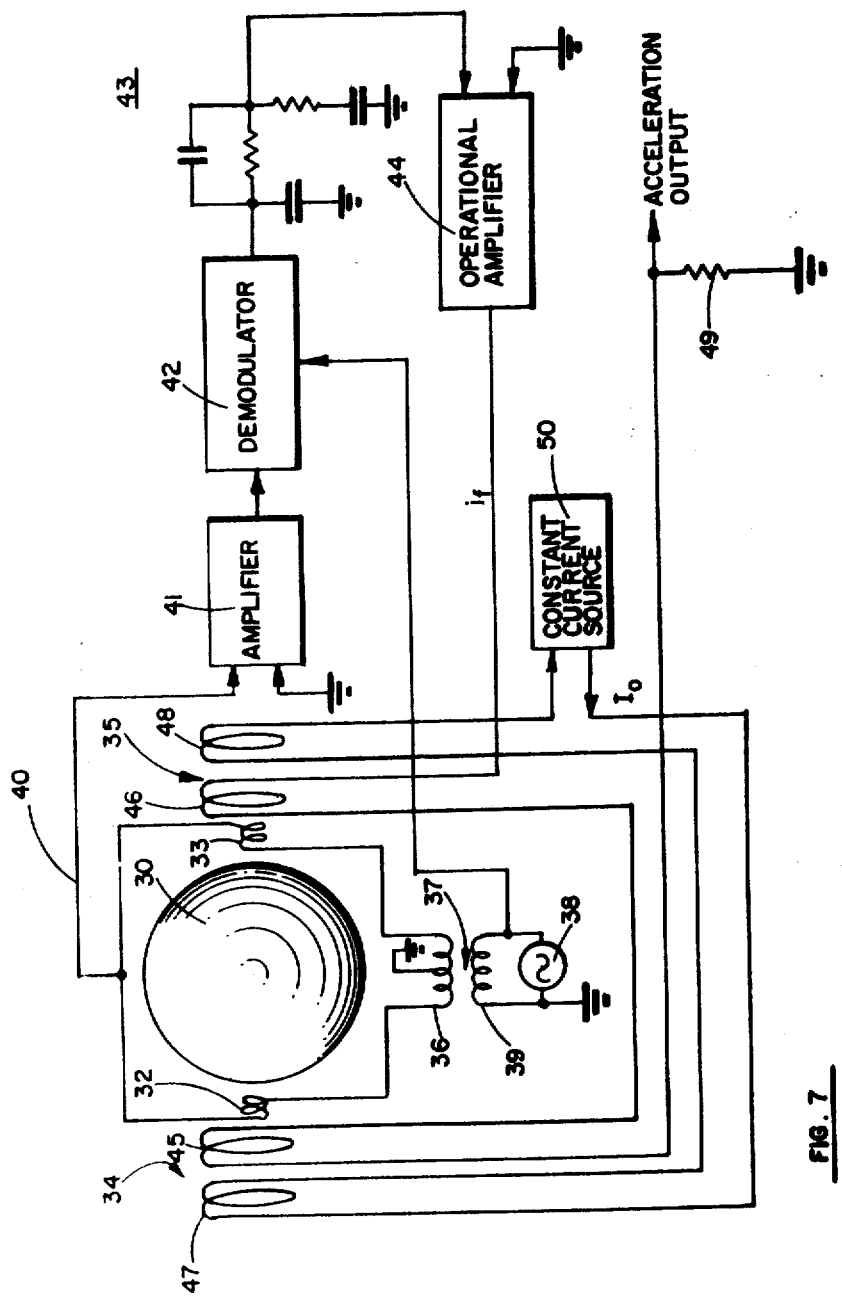
FIG. 7 is a circuit diagram, partially in block diagram form, of a pickoff and forcing circuit for the embodiment of FIG. 6.

Referring now to FIG. 7 there is shown a circuit diagram, partially in block form, of the electronics for the $x$ axis. Relative motion of spherical proof body 30 along the $x$ axis with respect to pickoff coils 32 and 33 will alter the inductance balance of a bridge circuit consisting of coils 32 and 33 connected in series across a center tapped secondary 36 of a transformer 37, the center tap being connected to ground. Transformer 37 is excited by a constant voltage carrier generator 38 coupled to the primary 39 thereof, carrier generator 38 having a frequency typically in the high audio frequency range, for example, 10 kHz to 20 kHz. Coils 32 and 33 typically consist of approximately 1,000 turns of small diameter magnetic wire wound in thin coils. The gap between proof body 30 and the surface of coils 32 and 33 is typically of the order of 0.025 to 0.05 cm.

When proof body 30 is centrally located between coils 32 and 33, the inductance of these coils is equal and there will be no output signal on a lead 40, connected between the coils 32 and 33 and ground, which constitutes the output of the bridge circuit. However, when proof body 30 is displaced from a central null position as, for example, it may be displaced closer to coil 32 and farther from coil 33 as a result of applying an acceleration to housing 31 directed to the right in FIG. 7, the inductance of coil 32 will increase and that of coil 33 will decrease resulting in a carrier signal on lead 40. The magnitude of this signal will be proportional to the displacement of proof body 30 from the central null position and the phase of the signal will be the same as that of generator 38 for displacement towards winding 32 and will be reversed in phase with respect to that of generator 38 for displacement towards coil 33.

The pickoff signal on lead 40 is amplified by an amplifier 41 and applied to a synchronous demodulator 42 which receives as its second input the carrier signal from generator 38. The techniques of amplification and demodulation are conventional and well known in the art. The output signal of demodulator 42 is a d.c. voltage having a magnitude proportional to the displacement of proof body 30 from the null position and a polarity in accordance with the direction of displacement. This signal is altered in magnitude and phase as a function of displacement rate by means of a stabilizing network 43. The parameters of network 43 are selected by techniques well known in the automatic control art to achieve stable operation of the complete force-servo loop.

The output signal from network 43 is applied to a differential operational amplifier 44. Amplifier 44 provides a current $i_f$ which is applied through a first portion 45 of forcing coil 34 and a first portion 46 of forcing coil 35 in series. Current $i_f$ is then coupled through a resistor 49 to ground. By making the gain of amplifier 44 very large, the output current $i_f$ flowing through windings 45 and 46 and resistor 49 is essentially proportional to the input voltage from network 43. Therefore, an indication of acceleration may be derived by sensing the voltage across resistor 49.

Forcing coils 34 and 35 also include windings 47 and 48, respectively. It is the function of coils 45–48 to generate a restoring force on proof body 30 which is proportional to the current $i_f$. Coils 45 and 46 are thin coils of many turns of magnetic wire wound on a larger diameter than coils 32 and 33, as shown in FIG. 6. In addition, coils 45 and 46 are located coaxially with coils 32 and 33 with the same gap between them and proof body 30 as was the case with coils 32 and 33. If we assume the magnetic paths of coils 45 and 46 to be equal, the forces on proof body 30 produced by a current $i_f$ in these coils will be, $$F_{45} = ki_f^2$$

$$F_{46} = -ki_f^2.$$

The resultant of these forces, $F_x$, is $$F_x = F_{45} + F_{46} = 0.$$

Hence, it is obvious that coils 45 and 46 carrying current $i_f$ cannot, by themselves, exert a force on proof mass 30. Therefore, coils 47 and 48 are added. Coil 47 is intimately wound with coil 45 and coil 48 is similarly wound with coil 46. A constant current $I_o$ from a current source 50 is passed serially through coils 47 and 48. Coil 48 is connected so that the flux it produces opposes that of coil 46 carrying current $i_f$ whereas coil 47 is connected so that the flux it produces adds to that of coil 45 carrying current $i_f$. Therefore, the net force on proof body 30 produced by coils 45–48 may be expressed as follows:

$$F_x = k(I_o + i_f)^2 - k(I_o - i_f)^2$$

$$= k(I_o^2 + 2I_o i_f + i_f^2) - k(I_o^2 - 2I_o i_f + i_f^2)$$

$$= 4kI_o i_f$$

Hence, a net force on proof body 30 along the x axis has been achieved which is linearly proportional to $i_f$. As a result of the closed loop servo action, this force is always in a direction so as to restore proof body 30 to its null position. Similar mechanizations apply to the y and z axes.

The force servo shown in FIG. 7 is of the analog variety wherein a voltage will be sensed across resistor 49 which is proportional to the acceleration along the x axis. Such an analog force servo may be readily converted to a digital force servo in a manner described in U.S. Pat. No. 3,131,564 entitled "Velocity Meter With Digital Readout." Such a conversion would require the insertion of a capacitor at the output of operational amplifier 44 and a means for sensing the charge across the capacitor for triggering constant current source 50 to provide pulses of current to coils 47 and 48 in the presence of acceleration. In this manner, a digital indication of acceleration may be derived.

Proof body 30 is preferably made of a ferromagnetic material having high permeability and very low retentivity or coercive force. It should be easily machinable so that it may be made hollow with precise wall thickness for close control of density. Favorable materials are 72 percent nickel-iron alloy, a ferrite, or a sintered finely-divided iron. A hollow proof body with a diameter of 2 cm would have to have a mass of about 4.2 gm for a specific gravity of unity. If it is made of nickel-iron alloy, the wall thickness would be approximately 0.045 cm. An outside plating of gold or chromium would be applied for a precision control of density, and to make the surface resistant to corrosion when immersed in water.

In accordance with the preferred embodiment of the invention, the effective density of the proof masses in the embodiments of FIGS. 1–7 is made to be in the neighborhood of unity to allow partial flotation of the proof masses, 2 or 30, in a fluid, maintained at constant density, to a high degree, i.e. to within one part in $10^4$ to $10^5$ of complete flotation. Under these conditions, the accelerometer may be tested in the laboratory by simply tilting the accelerometer off level. However, inasmuch as construction of a proof mass so as to predetermine its density to one part in $10^5$ would be difficult in practice, the following expedient may be used. The proof mass may be constructed for a nominal density slightly above unity, say 1.05, and the liquid used may be ordinary water, $H_2O$, suitably diluted with heavy water i.e. deuterium oxide, $D_2O$. Ordinary water has a very flat density maximum at 3.98° C, the density increasing by only about 1.3 parts in $10^5$ over a range of 3°–5° C. Heavy water has a similar density maximum at about 11° C where the density is about 1.1 so that a mixture can be made which will provide complete flotation at the maximum density point for a density of members 2 or 30 in the range of 1.0 to 1.1.

For test, the space surrounding proof body 1 in FIG. 1 or proof body 30 in FIG. 7 may be filled with a mixture of $H_2O$ and $D_2O$, as through an opening 7a shown in FIG. 1, and the temperature adjusted until neutral buoyancy (complete flotation) is obtained. The condition of complete flotation is indicated by the pickoff output remaining unchanged when the instrument case is turned upside down in the earth's gravity field. The water temperature is adjusted until this condition holds. In general, the temperature will have a value other than that corresponding to the maximum density condition since the density of the proof mass at this time is still unknown. However, knowing the composition of the mixture and the temperature at the point of neutral buoyancy, the density of the proof mass may be accurately determined. The mixture may then be replaced with another mixture of $H_2O$ and $D_2O$ which is known to have its density maximum near the experimentally determined density of the proof mass which resulted in complete buoyancy.

The accelerometer is then ready for test. However, under complete buoyancy conditions the instrument would become inoperative as an accelerometer. Therefore, the useful condition for test is at a selected temperature such as to provide a predetermined fraction of complete buoyancy. Accordingly, the experiment is conducted at a temperature slightly above or below the temperature of density maximum so that a fraction, such as 0.9999 of the weight of portions 2 or 30 is floated. This, in effect, attenuates gravity (g) to one part in $10^4$ of its free air value.

The instrument can now be tested in known ways, for example, by tilting it through known angles. A tilt of, say, $10^{-5}$ radians or 5 seconds of arc introduces a net component of gravity equal to $10^{-4} \times 10^{-5} = 10^{-9}$ g. If buoyancy conditions are adjusted for 0.99999 of complete flotation, the same tilt angle will introduce a component of only $10^{-10}$ g.

It is apparent that the system of the present invention allows application of exceedingly small accelerations to the instrument by a simple, non-critical procedure of tilting the accelerometer relative to g. It will be appreciated that application of $10^{-10}$ g by tilting in a conventional system would be quite impractical since a controlled tilt of $5 \times 10^{-5}$ seconds of arc is impossible. Furthermore, it will be appreciated that the invention allows the use of a restoring force applier which is not necessarily strong enough to operate under full 1 g conditions. Thus, in the embodiment of FIG. 1, the single turn conductor construction together with the rather wide gap necessitated by the hollow conductor construction, would require an undesirably large current to achieve null conditions at 1 g, whereas, small currents suffice in the intended range of application of $10^{-5}$ g and lower.

It will also be appreciated that no other known liquid except $H_2O$ or $D_2O$ or weak aqueous solutions will allow accurate maintenance of a very small departure from complete flotation because no other liquid has a similar density maximum or minimum and at the same time is entirely free from temperature hysteresis effects. For example, liquid sulphur and also certain organic solutions would show a density maximum or minimum associated with a change of state but the temperature of the maximum or minimum would be different depending upon whether the condition is approached from the high or the low side. As for the usual instrument flotation liquids such as fluorocarbons, hydrocarbon oils, silicone fluids, etc. the temperature coefficient of density is so high, of the order of a part in 1,000 per degree C, that excessively refined temperature controls would be required to obtain the purposes of the present invention.

Flotation can also be achieved with the aid of a compressed gas contained in a constant volume chamber, though for such expedient the density of the proof body must be made substantially lower than unity to avoid a requirement for excessively high gas pressures. In addition, gradient temperatures must be controlled to much closer limits in order to make the use of gas practical. With water, disturbances from convection currents due to temperature gradients, which can be troublesome when gas is used, should be strictly negligible because of the broad density maximum of water. Such arrangements do have the advantage over water of allowing use of electrostatic pickoffs and forcers and the avoiding of corrosion problems. IN addition, liquids of relatively high compressibility, e.g. ether, acetone and low viscosity silicone oils, can be used if maintained at constant volume over the temperature range by use of a very stout container. However, the use of such liquids appears to offer no special advantages over compressed gasses.

Whatever the flotation medium used, the following expedient is quite practical as a means of avoiding damage or calibration change of an instrument during the time it is on the earth and during the launch and ejection phases. The instrument is filled with fluid for test, as described, and after calibration and checkout the fluid is left in the case. With water, no special temperature control is required other than to prevent freezing or boiling; enough buoyancy being provided over the room temperature range and beyond to largely isolate the sensitive element from gravity and from shocks. When orbital conditions are obtained, the fluid is removed as by breaking a seal and allowing evaporation of liquid or escape of gases.

While the invention has been described with respect to several physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments but only by the scope of the appended claims.

We claim:

1. The method of producing an accelerometer for responding to small acceleration produced forces, which method comprises the following steps:
   providing a proof mass member and means for detecting displacement of the member;
   suspending said proof mass member for said accelerometer in an aqueous solution providing a substantially neutral buoyant support to said proof mass in an environment of approximately 1-g; and
   removing said solution from about said proof mass member to free said proof mass member to respond to acceleration produced forces applied to said accelerometer in an environment of substantially less than 1-g.

2. The method of claim 1 in which said proof mass member has a mass exceeding the linear range of said detecting means for the accelerometer and said fluid provides a substantial amount of isolation of said proof mass from gravity in approximately a one-g environment.

3. The method of claim 1 in which the proof mass member is suspended in an aqueous solution and the temperature is adjusted to produce a solution density which is substantially the same density as the proof mass member but not equal to the density of the proof mass member.

4. The method of claim 1 in which said aqueous solution is a mixture of $H_2O$ and $D_2O$.

5. The method of claim 1 in which the buoyant support provided is substantially complete flotation for said proof mass member.

6. The method of claim 1 in which the relative densities of said mass member and solution are adjusted to enable the accelerator to be tested for small accelerations in approximately a 1-g environment.

7. The method of providing an accelerometer capable of responding to very small acceleration produced forces of less than $10^{-3}$ g which method comprises the following steps:
   providing an accelerometer with a proof mass member and force sensing means in which the proof mass member total mass exceeds the linear range of the force sensing means in approximately a 1-g environment;
   disposing said proof mass in an aqueous solution to produce substantial buoyant support thereof and thereby isolate said proof mass from the 1-g environment to the extent required to maintain operation in the linear range of said force-sensing means; and
   removing said aqueous solution to decrease the buoyant support of said proof mass member for operation of said accelerator in an environment substantially less than said 1-g environment.

* * * * *